US005997988A

United States Patent [19]
Sada

[11] Patent Number: 5,997,988
[45] Date of Patent: Dec. 7, 1999

[54] MACHINE PART

[75] Inventor: Takashi Sada, Osaka, Japan

[73] Assignee: Koyo Seiko Co., Ltd., Osaka, Japan

[21] Appl. No.: 08/875,274

[22] PCT Filed: Nov. 20, 1996

[86] PCT No.: PCT/JP96/03390

§ 371 Date: Jul. 18, 1997

§ 102(e) Date: Jul. 18, 1997

[87] PCT Pub. No.: WO97/19278

PCT Pub. Date: May 29, 1997

[30] Foreign Application Priority Data

Nov. 21, 1995 [JP] Japan ..................................... 7-302763
Nov. 21, 1995 [JP] Japan ..................................... 7-302765

[51] Int. Cl.$^6$ .................................................. F16C 33/12
[52] U.S. Cl. .......................... 428/141; 428/220; 428/338;
428/409; 384/912; 384/913; 384/625; 384/7;
384/91
[58] Field of Search .................................... 428/141, 220,
428/338, 404; 384/912, 913, 625, 7, 91

[56] References Cited

U.S. PATENT DOCUMENTS 4,834,400  5/1989  Lebeck ..................................... 277/236
4,997,192  3/1991  Nagai et al. ............................ 277/96.2
5,064,298  11/1991 Hibi et al. ............................... 384/675
5,456,136  10/1995 Yamashita et al. ........................ 74/569
5,456,538  10/1995 Honda et al. ........................... 384/569
5,735,769  4/1998  Takemura et al. ......................... 476/40

FOREIGN PATENT DOCUMENTS 43 26 768   2/1995   European Pat. Off. .
0 661 470   7/1995   European Pat. Off. .
3-172608    7/1991   Japan .
6-050344    2/1994   Japan .
08232964    9/1996   Japan .

Primary Examiner—William P. Watkins, III
Attorney, Agent, or Firm—Rabin & Champagne, PC

[57] ABSTRACT

A machine part has a rolling contact surface (11a) having a lot of very small recesses which are independent of each other formed thereon. The maximum height (Ry) of a roughness profile (R) obtained by cutting the contact surface (11a) by a plane perpendicular to the contact surface (11a) is 1 to 3 μm, and the peak height Rp of a center line of the roughness profile (R) and the valley depth Rv of the center line satisfy the relationship of $Rp/Rv \leq 0.3$. In this case, the contact surface (11a) has very low crests which are relatively densely distributed and very deep troughs which are relatively sparsely distributed. A sufficiently wide contact area is ensured by the former very low crests which are relatively densely distributed. An oil sump in a sufficient amount is formed by the latter deep troughs which are sparsely distributed.

7 Claims, 4 Drawing Sheets

F I G. 4
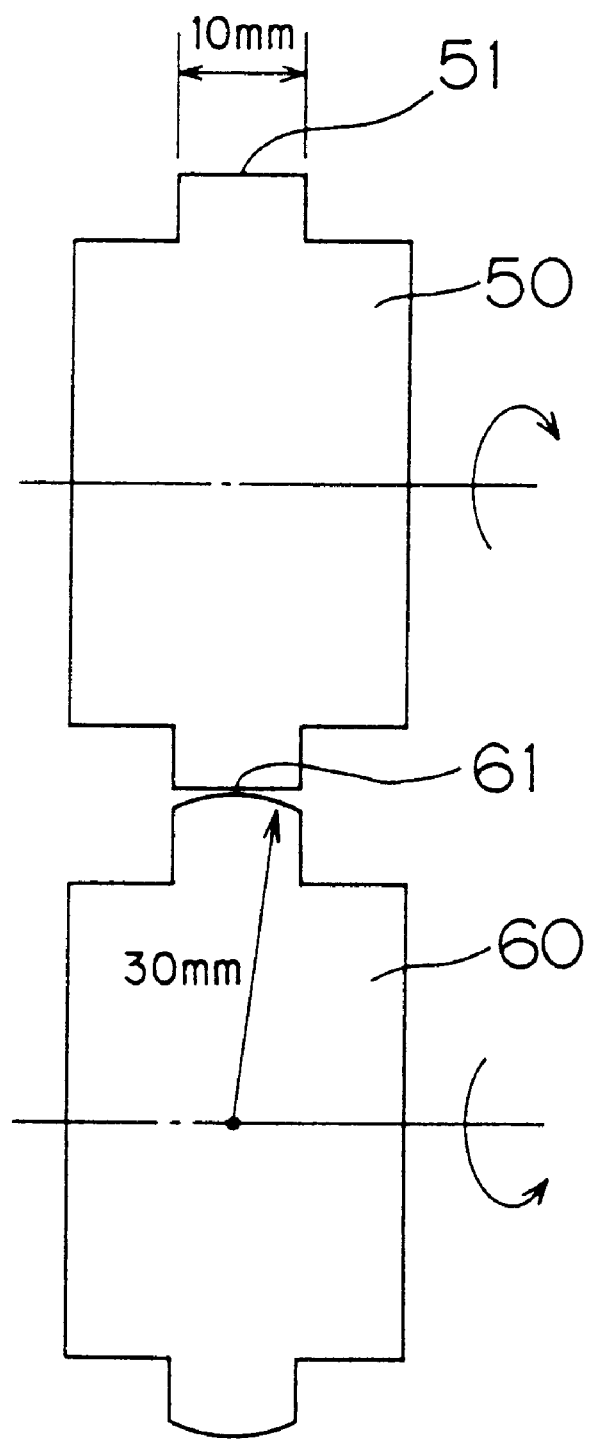

1

MACHINE PART

TECHNICAL FIELD

The present invention relates to a machine part having a contact surface which enters a state of at least one of rolling contact and sliding contact with another part opposite thereto.

BACKGROUND ART

Examples of a machine part having a contact surface which is mainly brought into rolling contact (that is, is brought into only rolling contact or is brought into rolling contact with sliding) include a roller for a cam follower, a bearing wheel, and a rolling element of a rolling bearing. Examples of the rolling element include a rolling element of a gear inner bearing which is incorporated into a rotation axis of a machine and is brought into direct contact with the rotation axis.

On the other hand, examples of a machine part having a contact surface which is brought into only sliding contact include a thrust washer which is brought into sliding contact while being pressed against an end surface of a roller.

Examples of the above-mentioned cam follower include one employed for a valve gear of the engine of an automobile, etc. The valve gear is constituted by a camshaft rotated while a crankshaft of the engine is rotated, and a mechanism for converting the rotation of the camshaft into vertical motion and transmitting the vertical motion to a poppet valve. Examples of the valve gear include ones of types such as a rocker arm type, a swing arm type, and a direct type depending on the difference in the transmitting mechanism.

In the valve gear, the rotation of the camshaft has been conventionally converted into vertical motion by a cam of the camshaft and a cam follower which is brought into sliding contact with an outer peripheral surface of the cam. In order to reduce the rotation load of the camshaft, however, valve gears of a construction in which a roller (a roller for a cam follower) is rotatably mounted on the cam follower, and an outer ring of the roller for a cam follower is brought into rolling contact with the outer peripheral surface of the cam of the camshaft, have increased in number in recent years.

In an OHC type engine or a DOHC type engine, for example, however, a camshaft is positioned above an engine casing, whereby lubricating oil is liable to be insufficiently supplied, and an outer peripheral surface of a cam is not cleanly surface-finished and is very rough, unlike a raceway surface of the bearing wheel and an outer peripheral surface of the rolling element of the rolling bearing. Therefore, a sufficient lubricating oil film is not formed on an outer peripheral surface of a roller for a cam follower.

Therefore, damage called peeling is produced on a rolling contact surface of the roller for a cam follower with the cam, to significantly reduce the life of an outer ring of the roller for a cam follower.

A technique for forming very small recesses on a sliding contact surface, using the recesses as an oil sump, and forming an oil film on the contact surface by the supply of oil from the oil sump has been proposed (see Japanese Patent Laid-Open No. 172608/1991, for example). It is considered that the technique is diverted into a machine part such as a roller for a cam follower.

However, there may, in some cases, be a case where sufficient durability is not obtained depending on how the very small recesses are formed.

SUMMARY OF THE INVENTION

An object of the present invention is to provide, in a machine part having very small recesses formed on its contact surface which is brought into rolling contact or sliding contact, a long-lived machine part having the stable capability to form an oil film.

In order to attain the above-mentioned object, in a preferred mode of the present invention, a machine part having a contact surface which enters a state of at least one of rolling contact and sliding contact with a counterpart opposite thereto is characterized in that a plurality of very small recesses which are independent of each other are formed on the contact surface, the maximum height in a portion extracted by a reference length from a roughness profile obtained by cutting the contact surface by a plane perpendicular to the contact surface is 1 to 3 μm, the peak height Rp above a center line and the valley depth Rv below the center line satisfy the relationship of Rp/Rv≦0.3, the maximum height Ry is defined by the distance between a straight line passing through the highest point in the extracted portion and parallel to the center line in the extracted portion and a straight line passing through the lowest point in the extracted portion and parallel to the center line, the peak height is defined by the distance between the center line and the highest point, and the valley depth is defined by the distance between the center line and the lowest point.

In this mode, the following function is carried out. That is, the contact surface having the maximum height in a predetermined amount (1 to 3 μm) and satisfying the condition of Rp/Rv≦0.3 in the roughness profile has very low crests which are relatively densely distributed and very deep troughs which are relatively sparsely distributed. A sufficient wide contact area is ensured by the former very low crests which are relatively densely distributed, and an oil sump in a sufficient amount can be formed by the latter very deep troughs which are relatively sparsely distributed. Consequently, peeling or the like is prevented from being produced on the contact surface, so that the durability can be reliably improved.

Furthermore, the above-mentioned condition relating to the maximum height Ry and the value of $R_{PK}/R_y$ is preferable if the roughness profile extracted along the direction of rolling satisfies the condition in the case of the rolling contact surface, while being preferable if the roughness profile extracted along the direction of sliding satisfies the condition in the case of the sliding contact surface.

The center line C is such a straight line that when a straight line parallel to an average line of the roughness profile is drawn, the area of a portion enclosed by the straight line and the roughness profile is equal on both sides of the straight line.

In a preferred mode of the present invention, the ratio of the open area of the very small recesses to the whole area of the contact surface is 5 to 20%.

The reason why the area ratio is restricted in this range is as follows. That is, if the area ratio is less than 5%, there are few very small recesses, whereby the capability to form a lubricating oil film is decreased. On the contrary, if the area ratio exceeds 20%, the very small recesses are liable to be enlarged. Correspondingly, there are possibilities that cracks appear, vibration and sound at the time of rolling are increased, and a counterpart is damaged. Particularly, the area ratio is more preferably 5 to 10%. The reason for this is that if the area ratio is not more than 10%, the tendency of the very small recesses to be enlarged can be further restrained.

In a preferred mode of the present invention, the machine part is composed of a hard carbon steel system material subjected to carbonitriding treatment, and the contact surface is subjected to surface treatment. Examples of the hard carbon steel system material include bearing steels. It is preferable that the surface treatment includes shot blasting for roughening the contact surface and barrel finishing for adjusting the roughness of the contact surface roughened by the shot blasting.

BRIEF DESCRIPTION OF THE DRAWINGS

FIG. 4 is a schematic view showing a principal part of a device for a durability test.

BEST MODE FOR CARRYING OUT THE INVENTION

Description is now made of one embodiment of a machine part of the present invention in conformity with an outer ring of a roller for a cam follower which is incorporated into a valve gear of an engine.

Figure 2:
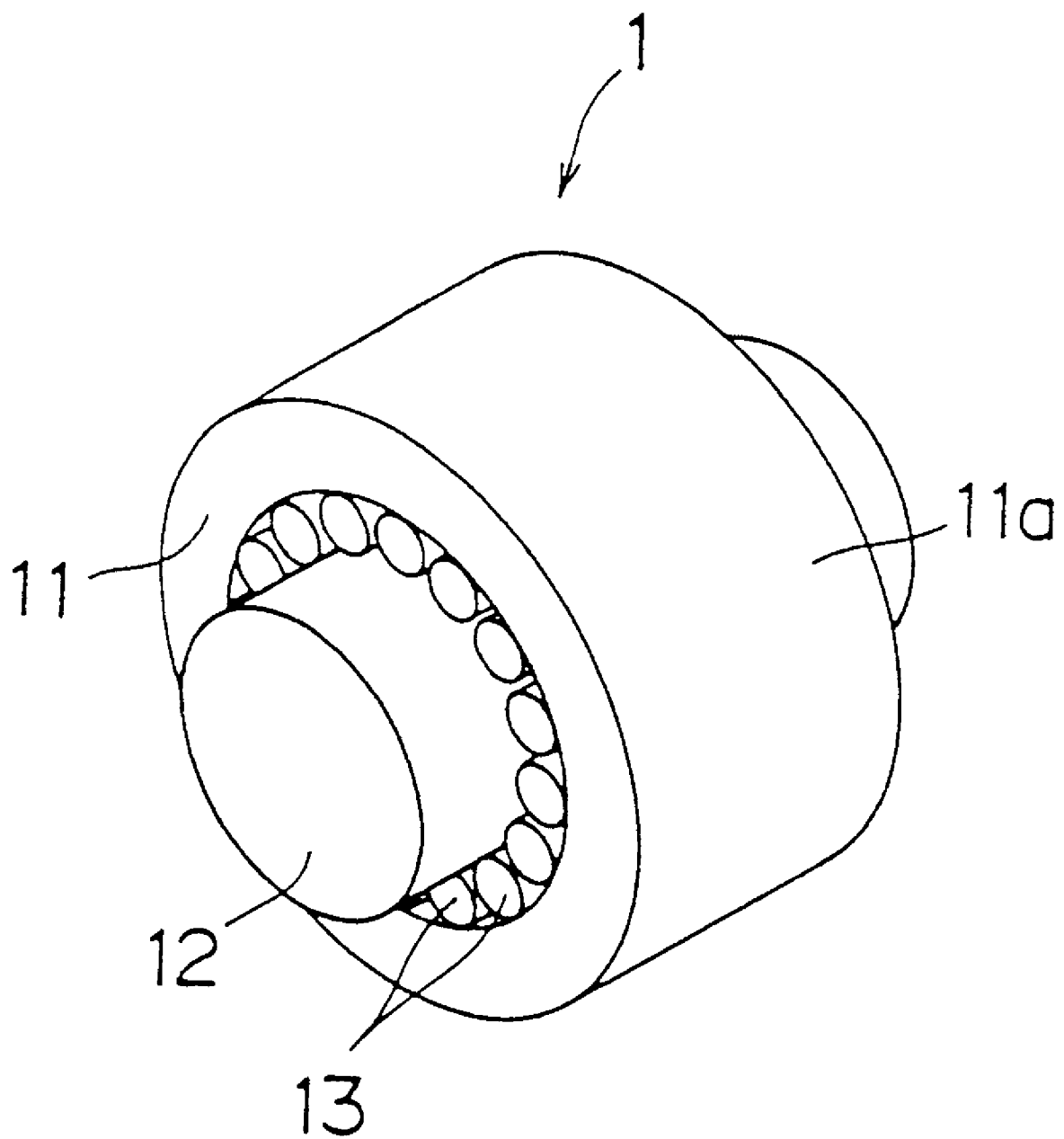
FIG. 2 is a perspective view showing the roller for a cam follower.

As shown in FIG. 2, a roller for a cam follower 1 comprises an outer ring 11, a shaft 12, and a plurality of rollers 13 so arranged that they can roll between the outer ring 11 and the shaft 12.

All the outer ring 11, the shaft 12 and the rollers 13 are formed of a hard carbon steel system material such as bearing steels SUJ2 (JIS-G4805, a high carbon chrome steel material). A plurality of very small recesses which are independent of each other are formed on a rolling contact surface 11a which is an outer peripheral surface of the outer ring 11.

Figure 1:
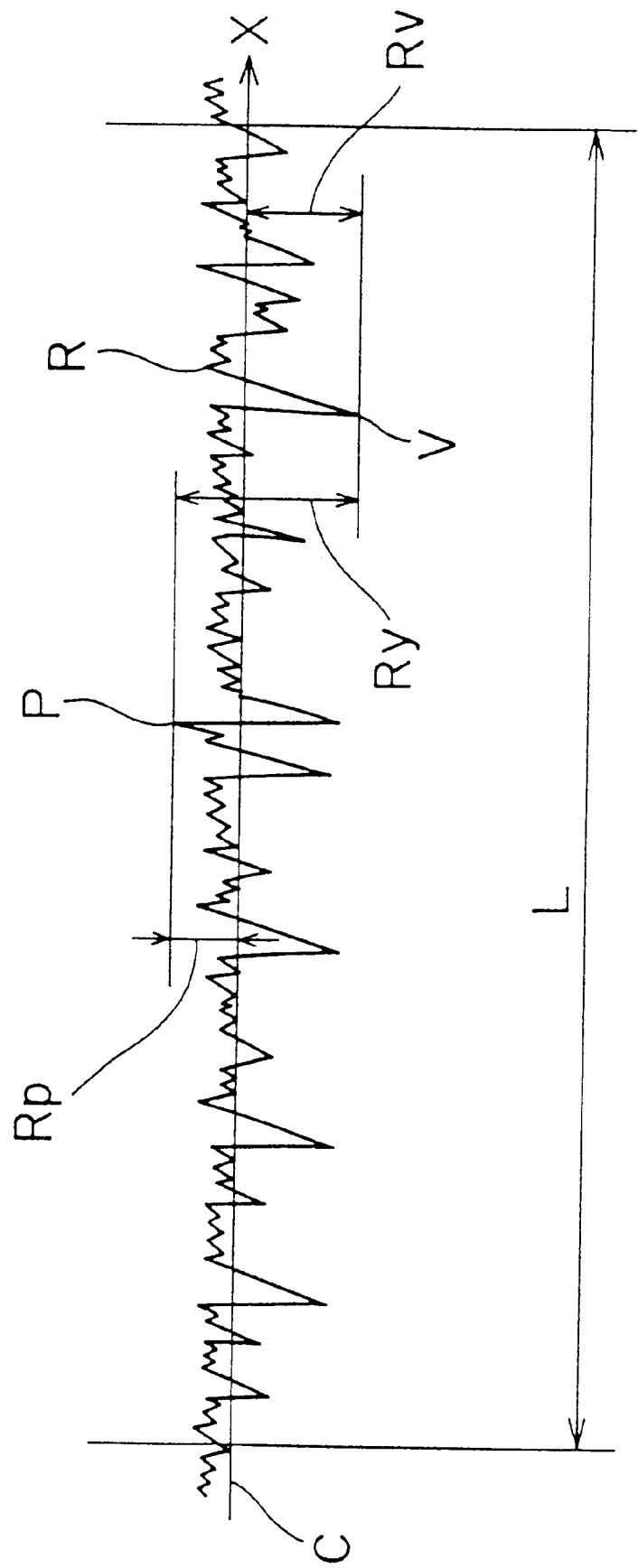
FIG. 1 is a graph showing a roughness profile of a rolling contact surface of an outer ring of a roller for a cam follower as one embodiment of a machine part of the present invention.

Referring to FIG. 1, in a roughness profile R extracted from the rolling contact surface 11a, the maximum height Ry is 1 to 3 μm, and the ratio Rp/Rv of the peak height Rp above a center line to the valley depth Rv below the center line is set to not less than 0.3. Further, the ratio of the open area of the very small recesses to the whole area of the rolling contact surface 11a, that is, the area ratio is set to 5 to 20% and more particularly, 5 to 10%.

The peak height Rp off the center line is a value of spacing between a center line C and a straight line passing through the highest point P in a portion extracted by a predetermined measured length L in the direction X of the center line from the roughness profile R and parallel to the center line C. On the other hand, the valley depth Rv off the center line is a value of spacing between the center line C and a straight line passing through the lowest point V in the portion extracted by the predetermined measured length L in the direction X of the center line from the roughness profile R and parallel to the center line C.

Furthermore, the maximum height Ry is a value of spacing between the straight line passing thorough the highest point P in the roughness profile R and parallel to the center line C and the straight line passing through the lowest point V and parallel to the arithmetical mean line C.

The outer ring 11 of the roller for a cam follower 1 in which the rolling contact surface 11a has the above-mentioned properties is fabricated by subjecting an outer ring, which has not been treated yet, composed of a hard carbon steel system material such as bearing steels to carbonitriding treatment, then roughening the rolling contact surface 11a by shot blasting, and then barrel- finishing the roughened rolling contact surface 11a. The outer ring 11 is combined with the shaft 12 and the plurality of rollers 13 which are composed of the same hard carbon steel system material, to fabricate the roller for a cam follower.

As the carbonitriding treatment out of the fabricating processes of the outer ring 11, either a carbonitriding process using a gas phase and a carbonitriding process using a liquid phase may be used. The former carbonitriding treatment using a gas phase is one for subjecting the outer ring, which has not been treated yet, composed of a hard carbon steel system material to a gas carburizing atmosphere into which $NH_3$ is introduced and treating the outer ring while holding the outer ring at a temperature of not less than a transformation temperature of the material. On the other hand, the latter carbonitriding process using a liquid phase is one for dipping the outer ring which has not been treated yet in a molten bath of a cyanide and treating the outer ring.

The outer ring 11 which has been subjected to the carbonitriding treatment is completed as a product by grinding the rolling contact surface 11a, then roughening the rolling contact surface 11a by shot blasting, and further barrel-finishing the roughened rolling contact surface 11a. The conditions of the shot blasting and the barrel finishing may be suitably so set that the surface roughness of the rolling contact surface 11a and the area ratio of the very small recesses are in the above-mentioned ranges. The area ratio can be measured by a known image processing method.

Figure 3:
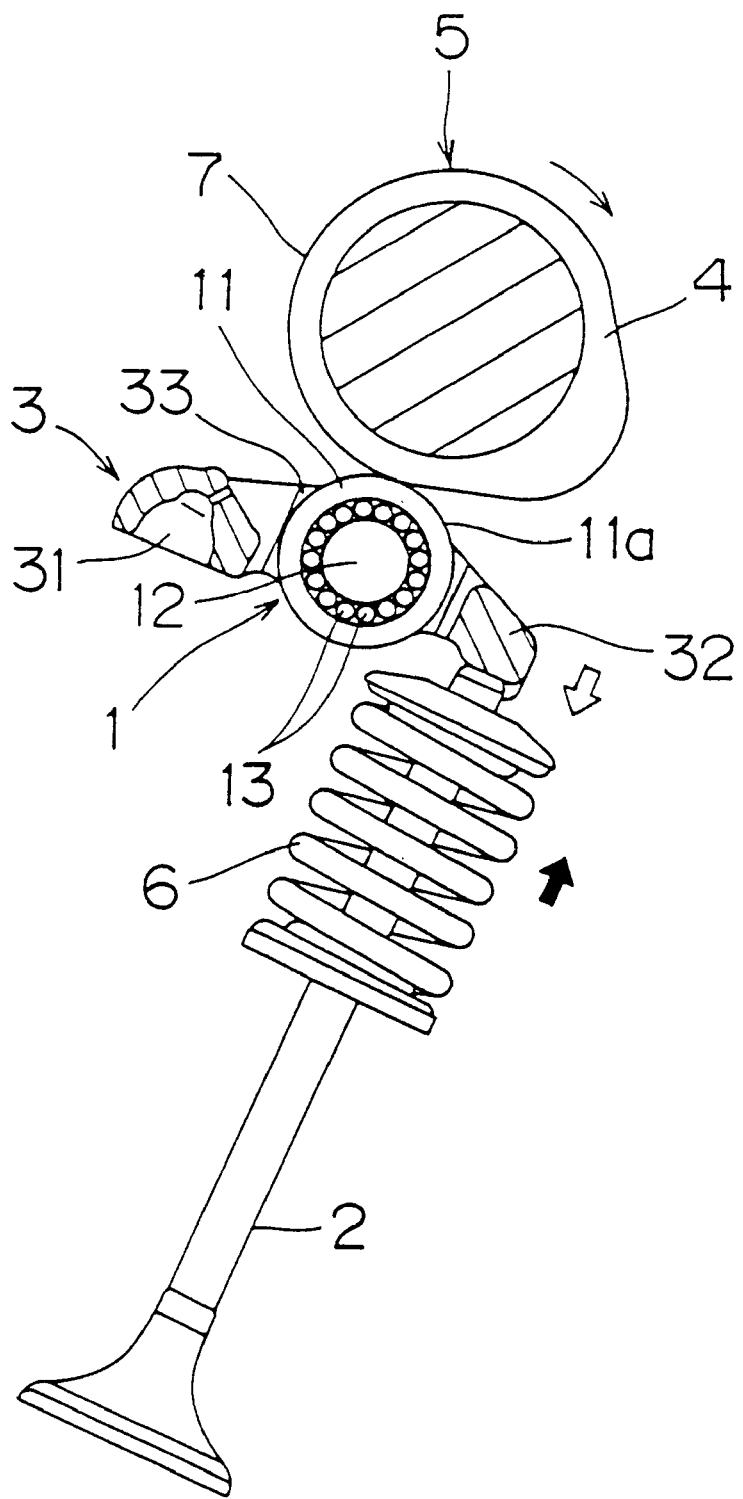
FIG. 3 is a partially cutaway front view showing a valve gear of an engine into which the roller for a cam follower is incorporated.

The roller for a cam follower 1 is used upon being incorporated in a valve gear for driving a popette valve 2 in the engine of an automobile, etc, as shown in FIG. 3, for example.

The valve gear shown in FIG. 3 is of a swing arm type, and is constituted by the above-mentioned popette valve 2, a swing arm 3 serving as a cam follower into which the roller for a cam follower 1 is incorporated, a camshaft 5 comprising a cam 4, and a restoring spring 6.

The swing arm 3 out of the foregoing has a recess 31 in which an adjuster support (not shown) is fitted at its one end, and has a pressing portion 32 for pressing the poppet valve 2 at the other end. A recess 33 into which the roller for a cam follower 1 is to be incorporated is formed without preventing an outer ring 11 of the roller for a cam follower 1 from being rotated in a portion intermediate between both the ends. The roller for a cam follower 1 is incorporated into the swing arm 3 by fixing a shaft 12 in the recess 33.

The cam 4 of the camshaft 5 has its outer peripheral surface to be a cam surface 7 which is brought into rolling contact with the rolling contact surface 11a which is an outer peripheral surface of the outer ring 11 of the roller for a cam follower 1 incorporated into the swing arm 3.

The respective portions are maintained in a state where an upper end of the poppet valve 2 is pressed against the pressing portion 32 of the swing arm 3 by upward pressure as indicated by a black arrow in FIG. 3 of the restoring spring 6, and the rolling contact surface 11a of the outer ring 11 of the roller for a cam follower 1 is brought into rolling contact with the cam surface 7 of the cam 4.

In the valve gear comprising the above-mentioned portions, when the camshaft 5 is rotated as indicated by an arrow of a thin line in FIG. 3, a lower right projection in FIG. 3 of the cam surface 7 of the cam 4 presses the roller for a cam follower 1 downward, whereby the swing arm 3 is rotated downward around the adjustor support fitted in the recess 31, and the pressing portion 32 presses the poppet valve 2 in the direction of opening, as indicated by a white arrow in FIG. 3, so that the poppet valve 2 is opened.

Furthermore, after the projection of the cam surface 7 passes through the roller for a cam follower 1, the swing arm 3 is rotated upward around the adjustor support by the above-mentioned upward pressure of the restoring spring 6, and the poppet value 2 is closed upon being pushed back in the direction of closing.

By the above-mentioned repetition, the poppet valve 2 is opened or closed at predetermined timing as the camshaft 5 is rotated.

Although the above-mentioned roller for a cam follower 1 has been used upon being incorporated in the valve gear of a swing arm type shown in FIG. 2, the roller for a cam follower can be used upon being incorporated in various valve gears such as the above-mentioned ones of a rocker arm type and a direct type. Further, the roller for a cam follower can be also used upon being incorporated in cam followers in various mechanisms excluding the above-mentioned valve gear.

Furthermore, the present invention is applicable to inner rings, outer rings and rolling elements of various rolling bearings in addition to the roller for a cam follower. For example, it is applicable to inner rings, outer rings and rollers of roller bearings such as a cylindrical roller bearing, a tapered roller bearing and a needle roller bearing. Particularly, it can be suitably used for a rolling element of a gear inner bearing which is incorporated in a rotation axis of a machine and is brought into direct contact with the rotation axis.

Furthermore, the present invention is applicable to a member having a flange surface for positioning in a thrust direction of a roller follower and a cam follower in addition to various thrust washers which are brought into sliding contact with end surfaces of a gear and a roller. Further, it is applicable to a bearing ring and a rolling element of a thrust bearing. Particularly, it can be suitably used for a cylindrical roller, a tapered roller and the like of a thrust roller bearing.

In addition thereto, the present invention is applicable to all machine parts each having a contact surface which enters a state of at least one of rolling contact and sliding contact with the other part opposite thereto.

Embodiments 1 to 3

A test cylinder 50 (see FIG. 4) having a diameter of 60 mmφ which has a rolling contact surface having a width of 10 mm on its outer periphery was turned and formed from bearing steels SUJ2, and the test cylinder was quenched at a temperature of 825° C. for five hours in a gas carburizing atmosphere into which $NH_3$ was introduced, and was further tempered and subjected to gas carburizing treatment at a temperature of 160° C. for two hours, after which the rolling contact surface was ground.

The rolling contact surface of the test cylinder was then subjected to shot blasting under the following conditions, and was then barrel-finished, to fabricate test cylinders in embodiments 1 to 3.
(Shot Blasting Conditions)
 Used device: air blasting device
 Tank pressure: 4 kgf/cm$^2$ (0.4 MPa)
 Projecting material: alumina (having a particle diameter of 63 to 105 μm)
 Treatment time: five minutes
(Barrel Finishing Conditions)
 Used device: centrifugal barrel finishing machine
 Speed of rotation: 170 r.p.m
 Media: ceramic sphere (having a diameter of φ5 mm)
 Compound: powder (water is added)
 Treatment time: 30 minutes The surface roughness of the rolling contact surface of the test cylinder in each of the embodiments 1 to 3 was then measured, to find the maximum height Ry, and find the ratio Rp/Rv of the peak height Rp off the center line to the valley depth Rv off the center line. The results were shown in the following Table 1.

An image obtained by microscopic observation was analyzed, to measure the ratio of the area occupied by openings of the very small recesses to the area of the rolling contact surface. The results in the respective embodiments were all in the range of 5 to 20%.

COMPARATIVE EXAMPLES 1 TO 4

A comparative example 1 is a test cylinder fabricated by lapping in place of the shot blasting and the barrel finishing in the fabricating methods in the respective embodiments, and has the same durability as that of the conventional product. A comparative example 2 is a test cylinder fabricated upon barrel finishing without performing shot blasting after grinding, and a very small groove extending in the circumferential direction formed at the time of the grinding is left in the test cylinder. Comparative examples 3 and 4 are test cylinders fabricated upon changing the conditions of the shot blasting and the barrel finishing in the same fabricating methods as those in the embodiments.

With respect to the comparative examples 1 to 4, the surface roughness was measured, to find the maximum height Ry, and find the ratio Rp/Rv of the peak height Rp off the center line to the valley depth Rv off the center line. The results were shown in Table 1.

Furthermore, an image obtained by microscopic observation was analyzed, to measure the ratio of the area of openings of very small recesses to the area of the rolling contact surface. In the comparative examples 1 and 2, no very small recesses exist. In the comparative example 3 in which very small recesses exist, the area ratio of the very small recesses is 20%. In the comparative example 4, the area ratio of the very small recesses is 30%.

TABLE 1

|  | Ry | | Rp / Rv | | test | drive |
| --- | --- | --- | --- | --- | --- | --- |
|  | A | C | A | C | cylinder | wheel |
| embodiment 1 | 2.3 | 1.4 | 0.09 | 0.18 | no damage | no damage |
| embodiment 2 | 1.8 | 1.1 | 0.18 | 0.29 | no damage | no damage |
| embodiment 3 | 3.0 | 2.5 | 0.26 | 0.19 | no damage | no damage |
| comparative example 1 | 0.2 | 0.2 | 0.97 | 0.87 | peeling | slight stripping |
| comparative example 2 | 1.0 | 0.2 | 0.21 | 0.72 | peeling | slight stripping |
| comparative example 3 | 2.5 | 1.8 | 0.43 | 0.32 | no damage | significant wear |
| comparative example 4 | 7.3 | 8.7 | 0.16 | 0.19 | recesses enlarged | significant wear |

A: axial direction
C: circumferential direction

Durability Test

Referring to FIG. 4, a drive wheel 60 made of bearing steels SUJ2 in which a rolling contact surface 61 has the same size and shape as those of the test cylinder 50 except that it is in the shape of R having a radius of 30 mm in a direction perpendicular to the circumferential direction and is ground-finished in the circumferential direction (the maximum height Ry=3 μm) was prepared. A simulated durability test using the test cylinder 50 corresponding to an outer ring and the drive wheel 60 corresponding to a cam was carried out.

The drive wheel and the test cylinder in each of the embodiments and the comparative examples were then so set that their rolling contact surfaces are brought into contact with each other at a contact stress of $P_{max}$=2300 MPa, and were continuously rotated $12\times10^5$ times under conditions of a rotation speed of 1000 r.p.m and a slide-roll ratio of zero (pure rolling) while dropping lubricating oil (turbine oil ISO-VG32) at a speed of 3 cc/min. The test was carried out under room temperature while allowing natural temperature rise caused by the rotation of the test cylinder and the drive wheel.

After the termination of the test, when the rolling contact surfaces 51 and 61 of the test cylinder 50 and the drive wheel 60 were observed using a microscope, the results shown in Table 1 were obtained. That is:

In the embodiments 1 to 3 satisfying the conditions of Ry =1 to 3 μm and Rp/Rv≦0.3 (hereinafter referred to as conditions A), both the rolling contact surfaces of the test cylinder and the drive wheel were not damaged, whereby the effect of the present invention was verified.

On the other hand, in the comparative example 1 (the conventional product) in which both the values of Ry and Rp/Rv deviate from the conditions A, peeling was produced on the rolling contact surface of the test cylinder, while slight stripping similar to the peeling was produced on the rolling contact surface of the drive wheel.

Also in the comparative example 2 in which the conditions A are satisfied in the axial direction, while both the values deviate from the conditions A in the circumferential direction, peeling was produced on the rolling contact surface of the test cylinder, while slight stripping similar to the peeling was produced on the rolling contact surface of the drive wheel. In the comparative example 2, the very small groove extending in the circumferential direction formed at the time of grinding is left, and the very small groove causes accumulated oil to flow in the circumferential direction (in the direction of rotation), whereby it is presumed that the capability to form an oil film is decreased. Consequently, it was found that the conditions A are preferably satisfied without specifying the direction.

In the comparative example 3 in which the condition relating to the value of Ry is satisfied, while the condition relating to the value of Rp/Rv is not satisfied, the rolling contact surface of the test cylinder was not damaged, while the wear of the rolling contact surface of the drive wheel was significant. In comparison between the embodiment 1 and the comparative example 3 which differ depending on whether or not the condition relating to the value of Rp/Rv is satisfied, therefore, the importance of the condition relating to the value of Rp/Rv was confirmed.

In the comparative example in which the condition relating to the value of Rp/Rv is satisfied, while the value of Ry greatly deviates from the condition relating to Ry, the very small recesses were enlarged on the rolling contact surface of the test cylinder, and a drive wheel in a counterpart significantly wore away.

What is claimed:

1. A machine part having a contact surface which enters a state of at least one of rolling contact and sliding contact with a counterpart opposite thereto, wherein a plurality of very small recesses, which are independent of each other are formed on the contact surface, a maximum height in a portion extracted in a reference length from a roughness profile, obtained by cutting the contact surface with a plane perpendicular to the contact surface, is 1 to 3 μm, the maximum height being a distance between a straight line passing through a highest point in the extracted portion and parallel to a center line in the extracted portion, and a straight line passing though a lowest point in the extracted portion and parallel to the center line, a peak height Rp off the center line and a valley depth Rv off the center line satisfy a relationship of Rp/Rv≦0.3, the peak height off the center line being defined by a distance between the center line and the highest point, the valley depth off the center line being defined by a distance between the center line and the lowest point; and the center line being a straight line passing through the roughness profile such that total areas enclosed by the straight line and the roughness profile are equal on both sides of the straight line.

2. A machine part according to claim 1, wherein a ratio of an open area of the very small recesses to a whole area of the contact surface is 5 to 20%.

3. A machine part according to claim 1, wherein a ratio of an open area a of the very small recesses to the whole area of the contact surface is 5 to 10%.

4. A machine part according to claim 1, wherein the contact surface is composed of a rolling contact surface, and the roughness profile is extracted along a direction of rolling of the rolling contact surface.

5. A machine part according to claim 1, wherein the contact surface is a sliding contact surface, and the roughness profile is extracted along a direction of sliding of the sliding contact surface.

6. A machine part according to claim 1, wherein the machine part is composed of a hard carbon steel system material subjected to carbonitriding treatment, and the contact surface is subjected to surface treatment.

7. A machine part according to claim 6, wherein the surface treatment includes shot blasting for roughening the contact surface and barrel finishing for adjusting the roughness of the contact surface roughened by the shot blasting.

* * * * *